Figures 1, 2:
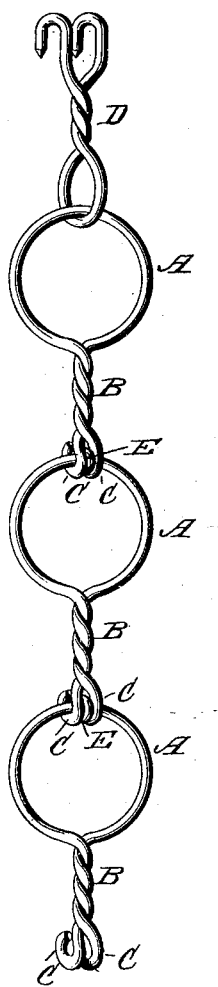

No. 707,715. Patented Aug. 26, 1902.
S. B. PARKER.
FIRE ESCAPE.
(Application filed June 9, 1902.)
(No Model.)

Witnesses
C. H. Williamson
M. E. Moore

Inventor
Simon B. Parker,
per Chas. M. Fowler,
Attorney

THE NORRIS PETERS CO., PHOTO-LITHO., WASHINGTON, D. C.

UNITED STATES PATENT OFFICE.

SIMON B. PARKER, OF SPRINGFIELD, MASSACHUSETTS.

FIRE-ESCAPE.

SPECIFICATION forming part of Letters Patent No. 707,715, dated August 26, 1902.

Application filed June 9, 1902. Serial No. 110,827. (No model.)

*To all whom it may concern:*

Be it known that I, SIMON B. PARKER, a citizen of the United States, residing at Springfield, in the county of Springfield and State of Massachusetts, have invented certain new and useful Improvements in Fire-Escapes; and I do hereby declare that the following is a full, clear, and exact description of the same, reference being had to the annexed drawings, making a part of this specification, and to the letters of reference marked thereon.

The present invention has relation to that class of fire-escapes comprising a series of links or rings suitably hinged together to form a rope or device by which the person may descend from a building or other structure.

The invention consists in a series of links or rings suitably hinged together to form a flexible rope or cable, said links or rings having suitable means to prevent the same moving laterally or sliding upon each other, as will be hereinafter described and claimed.

Figure 1 of the drawings is a front elevation of flexible rope or cable constructed substantially in accordance with my invention; Fig. 2, a detail view of one of the links or rings.

In the accompanying drawings, A represents a series of links or rings, which are constructed of wire of suitable thickness and strength and when connected together form a flexible cable or rope or other means by which a person may conveniently descend from a building or other structure. These links or rings are preferably provided with shanks B and hooks or other means by which the links or rings may be hinged together. In the present instance I have shown the shank B of wire twisted upon itself, the ends of the wire forming the shank terminating in hooks C as a means of loosely connecting one link or ring with the other; but any other suitable means may be provided for joining the links or rings together. The upper one of the links or rings is provided with a hanger D, of any suitable construction, by which the cable or rope formed by the series of links or rings may be conveniently engaged with a window-sill or other parts of a building or similar structure. Any convenient means may be provided for attaching the end of the cable or rope to the stationary object from which it is to depend, as I do not desire to confine my invention to the means shown or to the means employed of joining one link or ring with the other, as it is sufficient if the links or rings are engaged with each other in such a manner that a hinged connection will be obtained, and thereby provide a flexible cable or rope comprising a series of jointed links or rings.

It is desirable that one link or ring should not slide laterally on its fellow link or ring, and to prevent this is the essential feature of the invention. To attain this end, I provide the ring with suitable means that will form a stop, such as a lug or projection, as indicated at E and shown more clearly in Fig. 2 of the drawings. This stop E is suitably formed on the link or ring at the upper portion, and any means may be employed that serves the purpose of preventing the adjacent ring from sliding laterally thereon, thereby holding the series of links or rings in a true line with each other when any weight is placed thereon and prevent them from moving or swaying laterally independent of the other, the upper one of the links or rings not requiring this stop.

Having now fully described my invention, what I claim as new, and desire to secure by Letters Patent, is—

1. A fire-escape consisting of a flexible wire cable or rope comprising a series of links loosely connected together, and suitable means upon the upper ends of said links whereby one link is held against laterally sliding upon the adjacent link to which it is connected, substantially as and for the purpose set forth.

2. A fire-escape consisting of a flexible wire cable or rope, comprising a series of loosely-jointed links, and stops upon the upper ends of the links to hold the same against laterally sliding upon each other, substantially as and for the purpose described.

3. A fire-escape consisting of a flexible wire cable or rope comprising a series of links provided with shanks having means for engaging the shanks with the adjacent links, and stops upon the upper ends of the links to hold the same against sliding laterally upon each other, substantially as and for the purpose specified.

4. A fire-escape consisting of a flexible wire cable or rope comprising a series of links provided with twisted shanks at their lower ends terminating in hooks or other like means for engaging the adjacent link, and stops upon the upper ends of the links to hold said links against laterally sliding upon each other, substantially as and for the purpose set forth.

In testimony that I claim the above I have hereunto subscribed my name in the presence of two witnesses.

SIMON B. PARKER.

Witnesses:
ESTELLA M. LAPHAM,
NORA A. FERNALD.